(12) United States Patent
Chen

(10) Patent No.: US 11,402,659 B2
(45) Date of Patent: Aug. 2, 2022

(54) ASSEMBLY STRUCTURE OF SIDE COVER OF GLASSES

(71) Applicant: ARGUS VISION INTERNATIONAL LIMITED, Tainan (TW)

(72) Inventor: Lin Yun Chen, Tainan (TW)

(73) Assignee: ARGUS VISION INTERNATIONAL LIMITED, Tainan (TW)

( * ) Notice: Subject to any disclaimer, the term of this patent is extended or adjusted under 35 U.S.C. 154(b) by 410 days.

(21) Appl. No.: 16/812,357

(22) Filed: Mar. 8, 2020

(65) Prior Publication Data

US 2020/0301167 A1 Sep. 24, 2020

(30) Foreign Application Priority Data

Mar. 19, 2019 (TW) ................................. 108109260

(51) Int. Cl.
*G02C 5/14* (2006.01)
*G02C 11/00* (2006.01)

(52) U.S. Cl.
CPC .............. *G02C 5/146* (2013.01); *G02C 11/12* (2013.01)

(58) Field of Classification Search
CPC .... G02C 5/146; G02C 11/12; G02C 2200/08; G02C 5/16

USPC ............................................... 351/41, 44, 47
See application file for complete search history.

(56) References Cited

U.S. PATENT DOCUMENTS

| | | | | |
|---|---|---|---|---|
| 5,889,575 A | * | 3/1999 | Wang | ................... G02C 5/2245 351/113 |
| 2019/0235272 A1 | * | 8/2019 | Otra | ........................ G02C 5/146 |

* cited by examiner

*Primary Examiner* — Tuyen Tra
(74) *Attorney, Agent, or Firm* — Bruce Stone LLP; Joseph A. Bruce

(57) ABSTRACT

Provided is an assembly structure of a glasses side cover, including glasses, at least one sliding block and at least one side cover. The glasses have two temples. One side of at least one temple is provided with a mounting slot, a bottom of the mounting slot is provided with a insertion hole, and a slot wall of the mounting slot is provided with a track. The at least one sliding block is provided with a convex portion, and operatively slides back and forth along the track. The at least one side cover has a protective plate and an assembly member provided on a top of the protective plate. The assembly member is inserted into the mounting slot through the insertion hole, and the assembly member is provided with a notch. The convex portion of the at least one sliding block slides back and forth with the at least one sliding block to drive the convex portion to be inserted into or disengaged from the notch of the at least one side cover such that the at least one side cover is operatively fixed or detached from the at least one temple.

6 Claims, 8 Drawing Sheets

ASSEMBLY STRUCTURE OF SIDE COVER OF GLASSES

BACKGROUND OF THE INVENTION

1. Field of the Invention

The present disclosure relates to a pair of glasses, and more particularly to a structure in which a side cover is assembled or disengaged operatively.

2. The Prior Arts

Spectacles are a tool for protecting eyes and correcting eyesight. However, in general industry, in order to prevent mechanical or chemical damage, such as splashing particles and spraying chemicals, operators will wear appropriate protective glasses when working. In the early industrial protective glasses, in order to ensure that there is not gap in the shielding range, the glasses and the protective cover provided one the glasses are integrally formed of plastic to prevent objects from entering the eyes of the wearer. However, since the protective glasses are integrally formed, the temples cannot be bent, which makes it difficult to store. General protective glasses do not have optical power. When there is a need for a vision corrector, the user first removes the original optical power glasses and then wears protective glasses separately. However, this method may cause poor eyesight at work.

Further, there is another structure in which the protective sheet is formed on the temples. Although the structure can collapse the temples and the lens can be configured with optical power, the protective sheet cannot be removed and is relatively simple in use. As such, the above problems still have room for improvement in the structural design of the glasses.

SUMMARY OF THE INVENTION

In light of the foregoing problems, an objective of the present disclosure is to provide an assembly structure of a glasses side cover.

In an embodiment of the present disclosure, the present disclosure provides the assembly structure of the glasses side cover, including glasses, having a frame and temples that are pivotally connected to both sides of the frame, wherein one side of at least one temple is provided with a mounting slot, a bottom of the mounting slot is provided with a insertion hole, and a slot wall of the mounting slot is provided with a track; at least one sliding block, provided at a slot of the mounting slot, wherein the at least one sliding block is provided with a convex portion toward the mounting slot, and the at least one sliding block is provided with a guide portion corresponding to the track such that the at least one sliding block operatively slides back and forth along the track; and at least one side cover, having a protective plate and an assembly member provided on a top of the protective plate, wherein the assembly member is inserted into the mounting slot through the insertion hole, and the assembly member is provided with a notch.

As such, according to the embodiment of the present disclosure, the convex portion of the at least one sliding block slides back and forth with the at least one sliding block to drive the convex portion to be inserted into or disengaged from the notch of the at least one side cover such that the at least one side cover is operatively fixed or detached from the at least one temple.

DETAILED DESCRIPTION OF THE PREFERRED EMBODIMENT

The detailed description of the present invention is provided in combination with the accompanying drawings.

Figure 1:
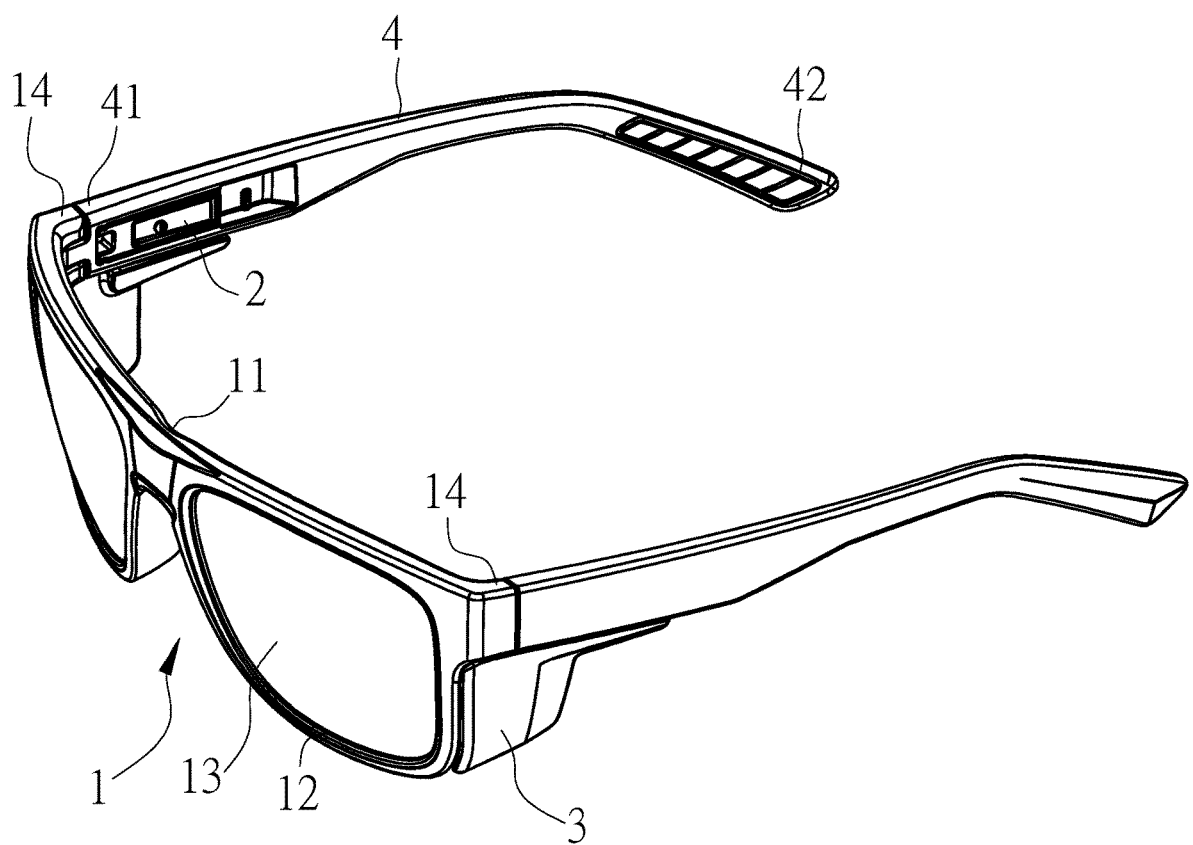
FIG. 1 is a three-dimensional schematic diagram of the present disclosure.
Figure 2:
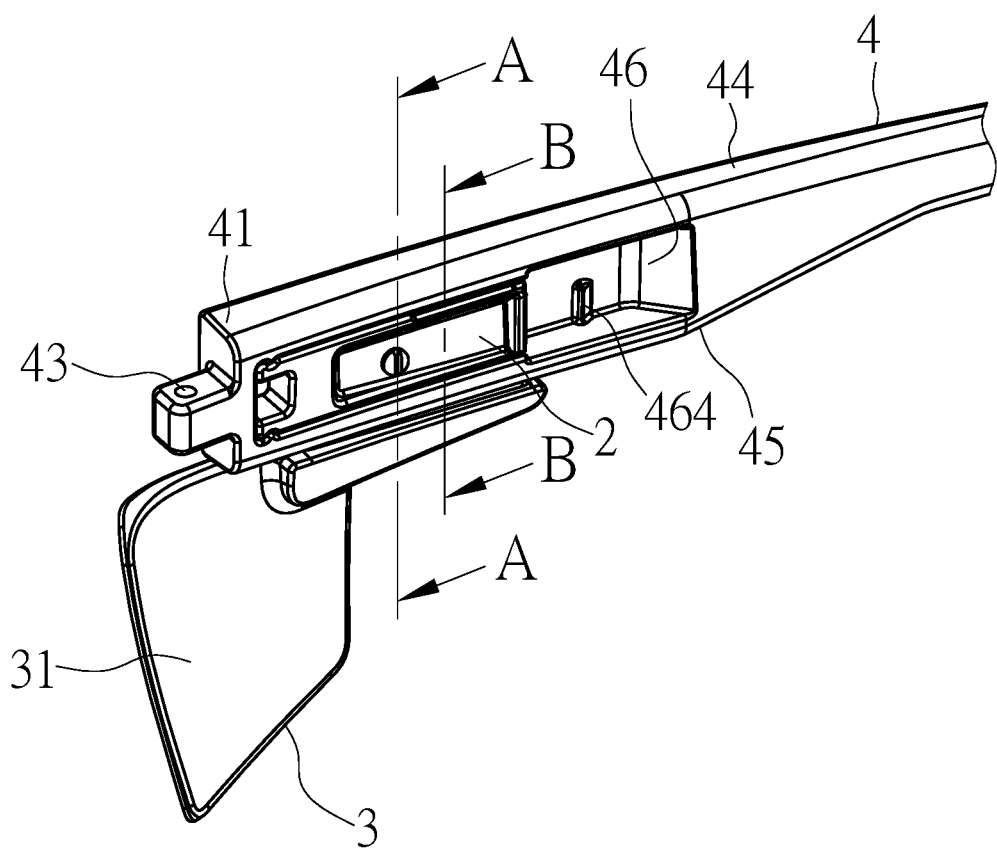
FIG. 2 is a three-dimensional schematic diagram of a temple and a side cover according to an embodiment of the present disclosure.
Figure 3:
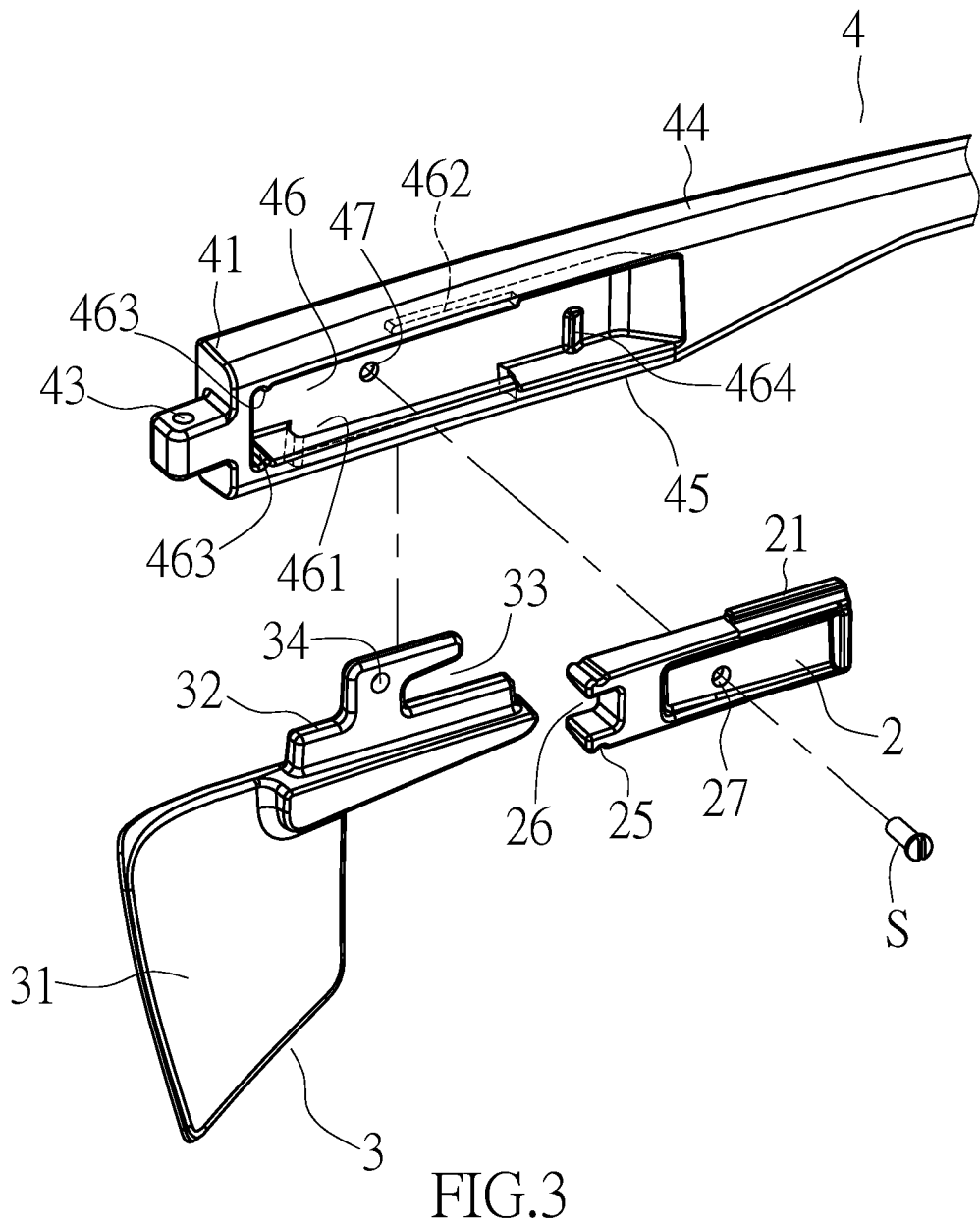
FIG. 3 is an exploded three-dimensional schematic diagram of FIG. 2 according to the embodiment of the present disclosure. showing along the line A-A of FIG. 2 according to the embodiment of the present disclosure.
Figure 4:
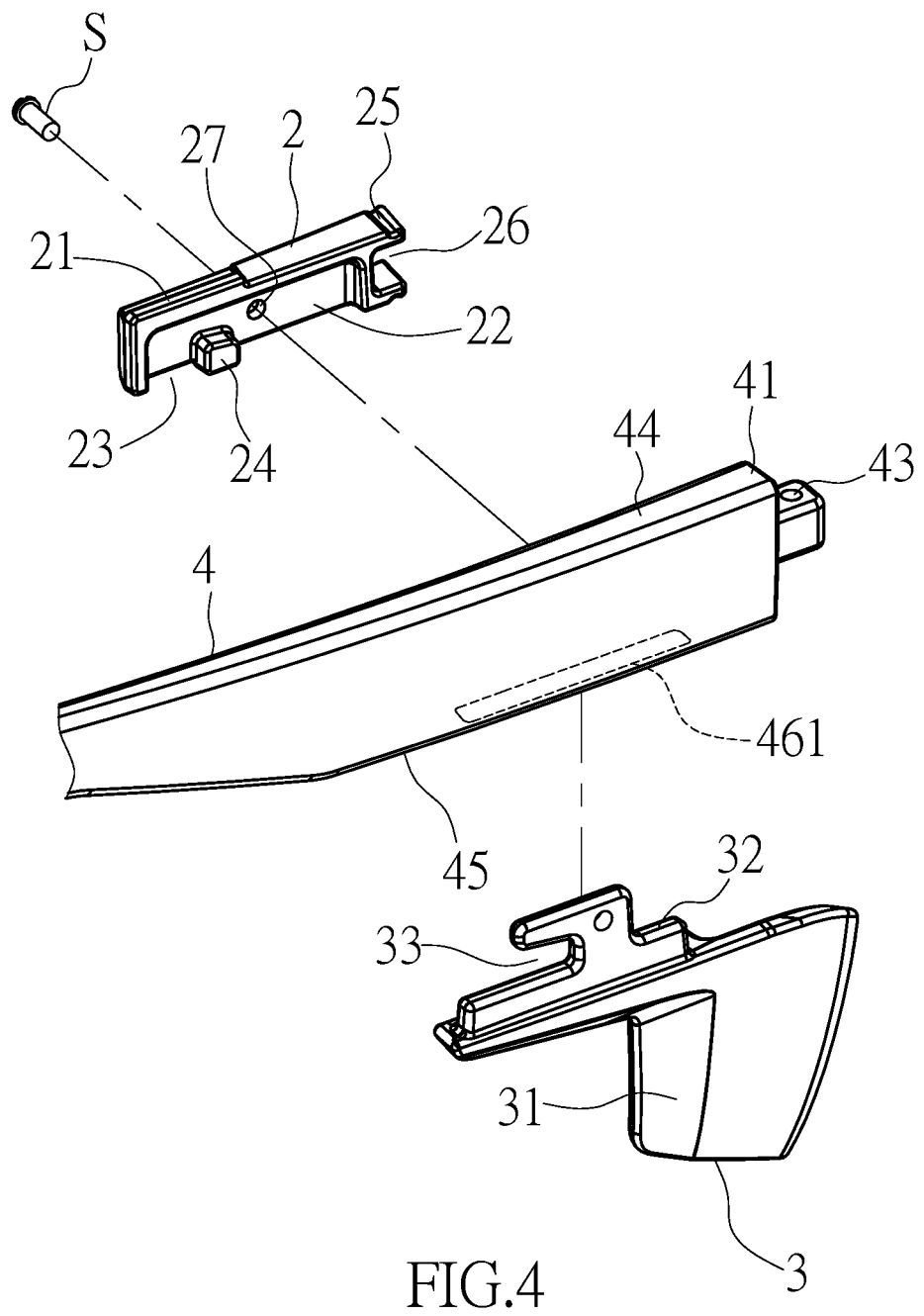
FIG. 4 is an exploded three-dimensional schematic diagram showing another view of FIG. 2 according to the embodiment of the present disclosure.
Figure 5:
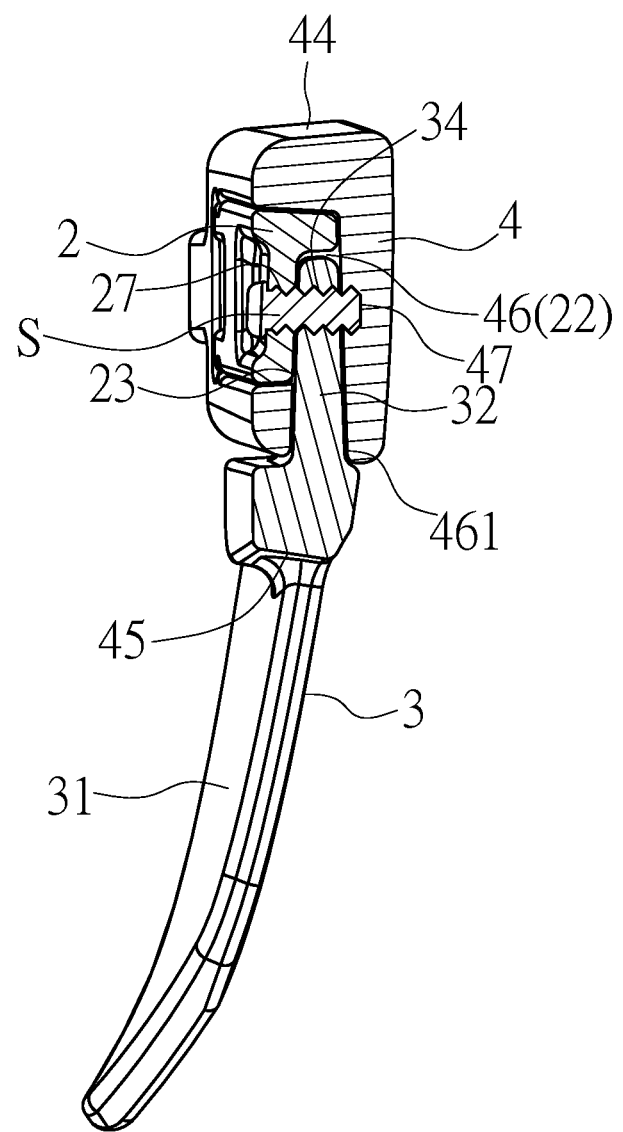
FIG. 5 is a partially three-dimensional cross-sectional schematic diagram taken along the line A-A in FIG. 2 according to the embodiment of the present disclosure.
Figure 6:
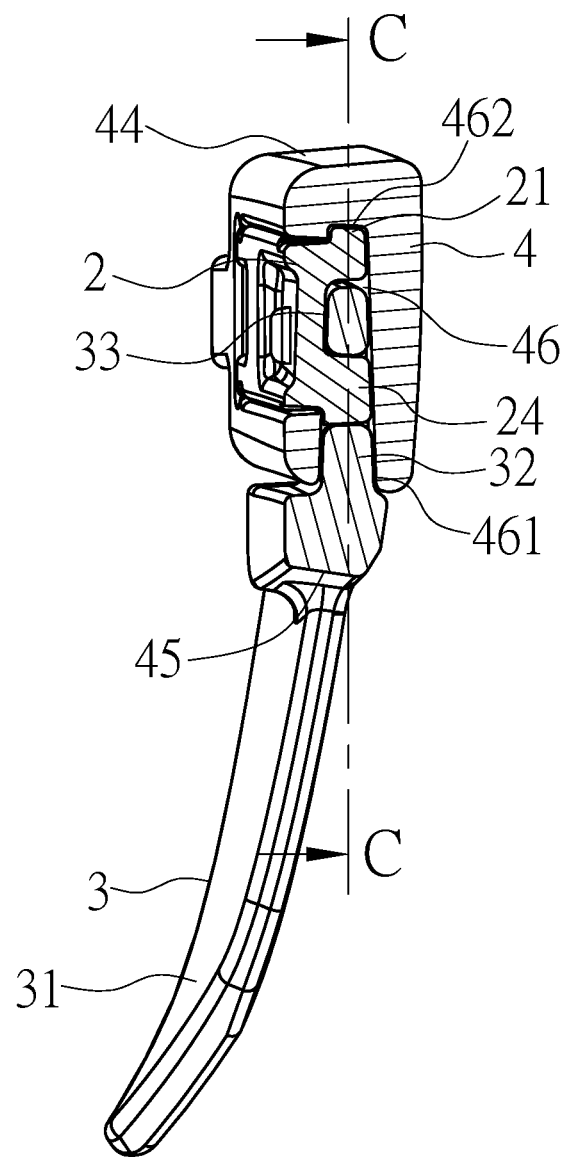
FIG. 6 is a partially three-dimensional cross-sectional schematic diagram taken along the line B-B in FIG. 2 according to the embodiment of the present disclosure.

Please refer to FIGS. 1-6. According to a preferred embodiment of the present disclosure, an assembly structure of a glasses side cover mainly includes glasses 1, at least one sliding block 2 and at least one side cover 3. FIG. 1 illustrates two sliding blocks and two side covers.

The glasses 1 may be, for example, sunglasses, work glasses, glasses with optical power, and the like. The glasses 1 1 have a frame 11 and temples 4 pivotally connected to both sides of the frame 11. The frame 11 has two lens slots 12 and two lenses 13 embedded in the lens slots 12. A pivot base 14 is provided on each side of the frame 11. Each of the temples 4 has a front end 41 and a rear end 42 separated in the length direction of the temples 4. A front end 41 of each of the temples 4 is provided with a pivot portion, and is pivotally connected to the pivot base 14 of the frame 11. The rear end 42 of each of the temples 4 is used to be worn on the ear of the user. Each of the temples 4 further includes an upper end 44 and a lower end 45 separated in a width direction of the temple 4.

A mounting slot 46 is embedded on the inner surface of the at least one temple 4. The above-mentioned inner surface refers to one side of the least one temple 4 facing the face. The mounting slot 46 is between the upper end 44 and the lower end 45 of the at least one temple 4. A insertion hole 461 is provided in the mounting slot 46 through the lower end 45 of the at least one temple 4. The mounting slot 46 is provided with a track 462 opposite to the slot wall of the insertion hole 461. In the embodiment of the present disclosure, the insertion hole 461 is an elongate shape, and the track 462 is a groove, but not limited thereto.

The at least one sliding block 2 is provided at the slot of the mounting slot 46, and a guide portion 21 is provided corresponding to the track 462. The guide portion 21 is accommodated in the track 462. A side opening 22 and a lower opening 23 are connected to one side of the at least one sliding block 2 facing the mounting slot 46. The side opening 22 and the lower opening 23 are connected to the mounting slot 46. The at least one sliding block 2 is provided with a convex portion 24 toward the mounting slot 46. The at least one sliding block 2 operatively slides back and forth along the track 462 with its guide portion 21.

The at least one side cover 3 has a protective plate 31 and an assembly member 32 provided on the top of the protective plate 31. The assembly member 32 extends integrally with the protective plate 31, and is provided with a notch 33. The assembly member 32 is inserted into the mounting slot 46 through the insertion hole 461 at the lower end of the at least one temple 4.

Figure 7:
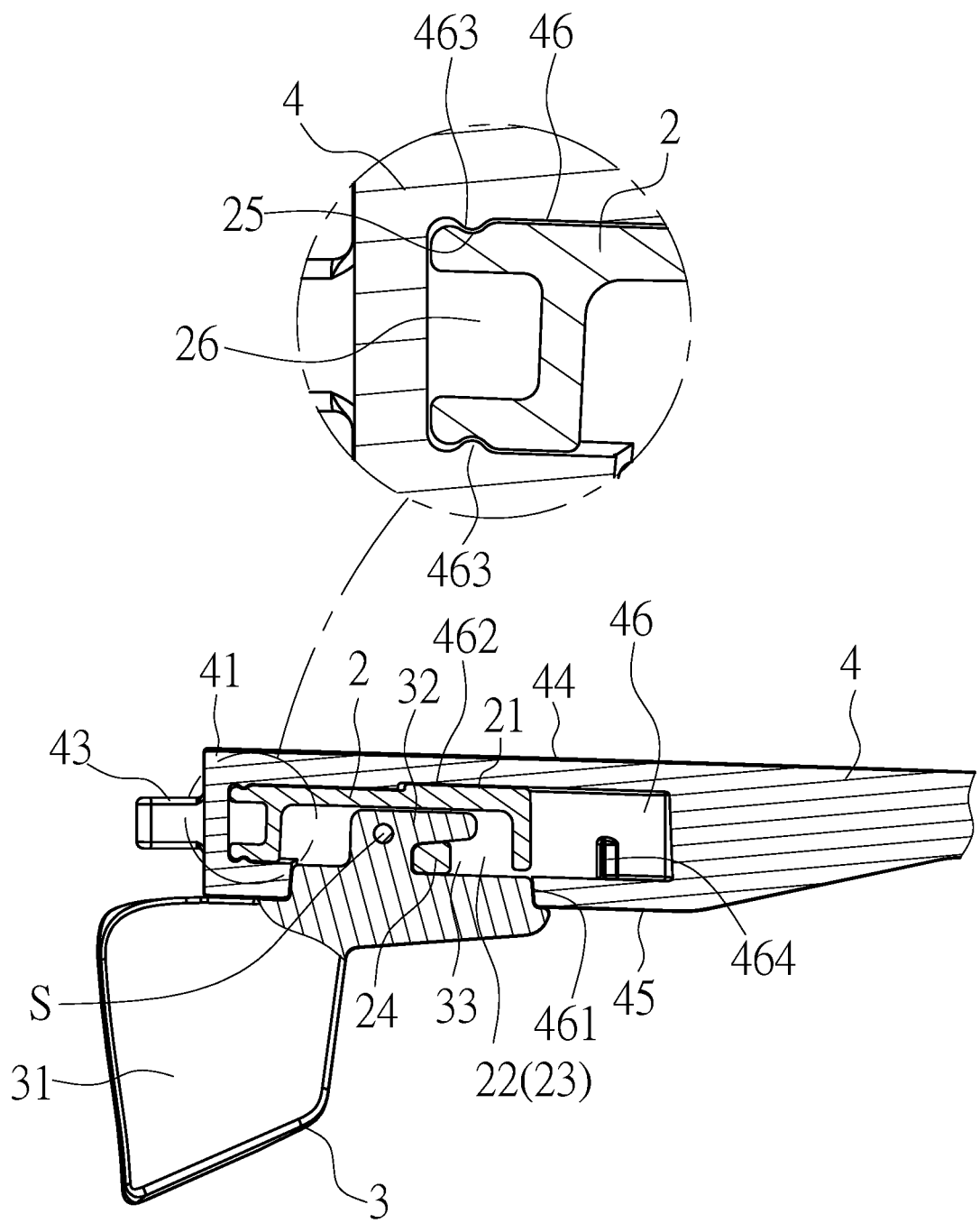
FIG. 7 shows a cross-sectional schematic diagram taken along the line C-C in FIG. 6 and a partially enlarged diagram thereof according to the embodiment of the present disclosure.
Figure 8:
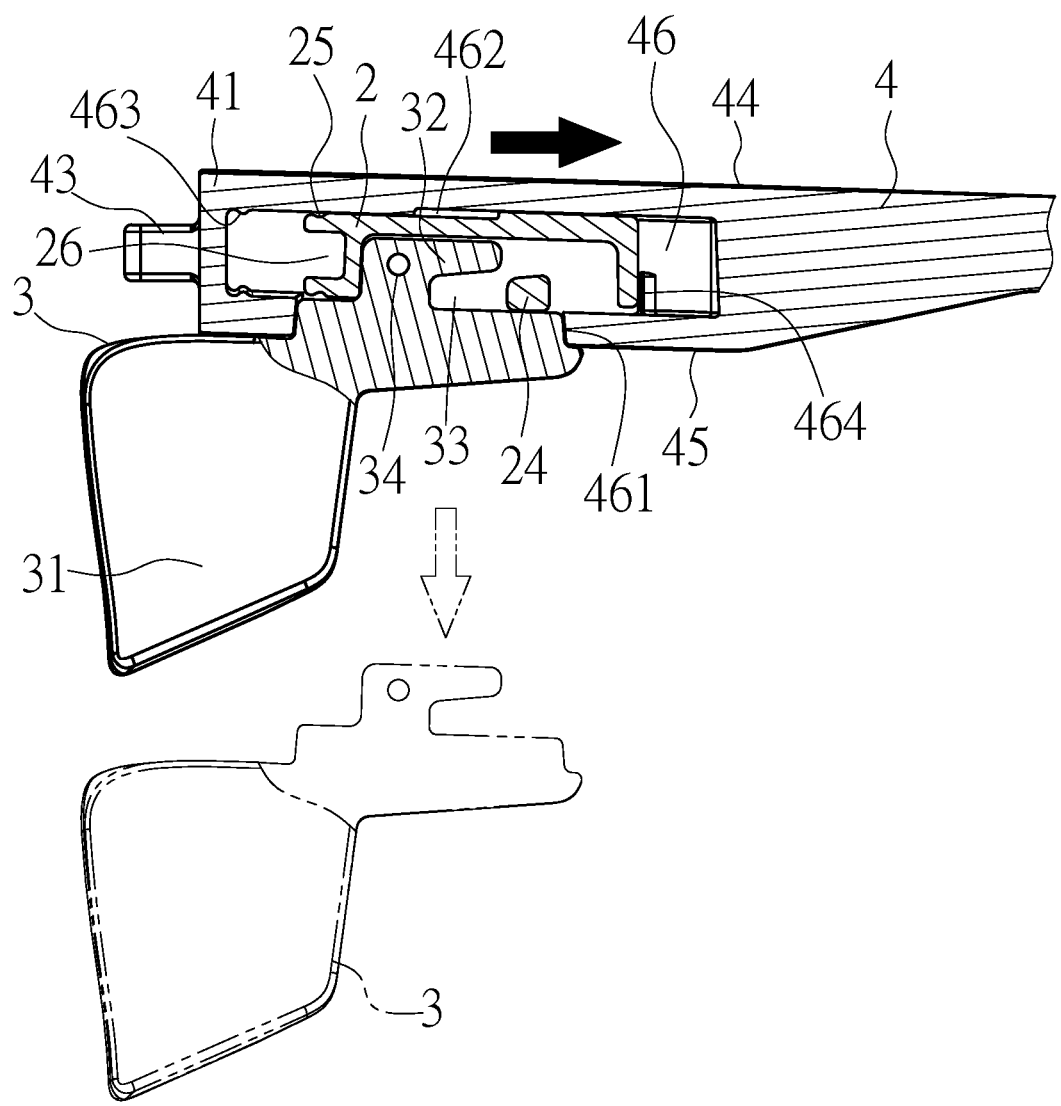
FIG. 8 is a schematic diagram of the operation of the present disclosure.

With reference to FIG. 7 and FIG. 8, when the at least sliding block 2 slides to the mounting slot 46 adjacent to the pivot portion 43, the convex portion 24 of the at least sliding block 2 is simultaneously embedded in the notch 3 of the at least one side cover 3. The downward movement of the at least one side cover 3 is restricted by the convex portion 24, and the at least one side cover 3 is fixed to the relative position of the at least one temple 4. Herein, two adjacent side edges of the protective plate 31 abut against the lower end 45 of the at least one temple 4 and one side of the frame 11, respectively, and cover the outside of the user's eyes such that the glasses form protective glasses. Conversely, when the at least one sliding block 2 slides to the mounting slot 46 away from the pivot portion 43, the convex portion 24 is simultaneously separated from the notch 33 of the at least one side cover 3 to enable the at least one side cover 3 to be detached from the at least one temple 4. Accordingly, the glasses 1 can be worn as normal glasses.

Furthermore, in the present disclosure, the at least one sliding block 2 can be fixed when it is adjacent to the pivot portion 43. A first buckle 463 is provided on each of the upper and lower slot walls of the mounting slot 46 adjacent to the pivot portion 43. The at least one sliding block 2 is correspondingly provided with two second buckle 25, and an elastic space 26 is provided between the two second buckle 25. When the convex portion 24 of each sliding block 2 is inserted into each of the notches 33, each of the second buckle 25 is elastically buckled into each of the first buckle 463 with its material, and each of the second buckle 25 is compressed when it is elastically buckled, and deforms toward the elastic space 26. In the embodiment of the present disclosure, the first buckle 463 is a rib extending from the mounting slide 46, and the second buckle 25 is a groove, but not limited thereto. For example, any structure capable of forming a concave-convex corresponding buckle is within the scope of the present disclosure.

As specified above, in the present disclosure, a stop portion 464 is provided on a slot wall of the mounting slot 46 opposite to the pivot base 14. When the at least one sliding block 2 slides until the convex portion 24 leaves the notch 33, one side of the at least one sliding block 2 is abutted against the stop portion 464 to form a block, thereby preventing the at least one sliding block 2 from sliding over the head in the reverse direction toward the pivot base 14 so as to fall out of the mounting slot 46.

Please refer to FIG. 1 to FIG. 8. In order that the at the at least one sliding block 2 is provided with a first perforation 27, the at least one side cover 3 is provided with a second perforation 34, and the mounting slot 46 of the at least one temple 4 is provided with a third perforation 47 aligned and communicating with the second perforation 34. When the at least one sliding block 2 slides to the convex portion 24 embedded in the notch 33 of the at least one side cover 3, the first perforation 27 is aligned and communicates with the second perforation 34 and the third perforation 47. At least one screw S is provided to be screwed to the first perforation 27, the second perforation 34 and the third perforation 47 which are aligned and communicated. As such, the at least one temple 4, the at least one sliding block 2 and the at least one side cover are assembled together in a screwing manner such that a user can obtain a reliable protection effect when worn. Hence, in the embodiment of the present disclosure, when the at least one side cover 3 is disengaged from the at least one temple 4, the at least one screw S must be unscrewed before the sliding movement of the at least one sliding block 2 is performed.

Although the present disclosure has been described with reference to the preferred exemplary embodiments thereof, it is apparent to those skilled in the art that a variety of modifications and changes may be made without departing from the scope of the present disclosure which is intended to be defined by the appended claims.

What is claimed is:

1. An assembly structure of a glasses side cover, comprising:
   glasses, having a frame and temples that are pivotally connected to both sides of the frame, wherein one side of at least one temple is provided with a mounting slot, a bottom of the mounting slot is provided with a insertion hole, and a slot wall of the mounting slot is provided with a track;
   at least one sliding block, provided at a slot of the mounting slot, wherein the at least one sliding block is provided with a convex portion toward the mounting slot, and the at least one sliding block is provided with a guide portion corresponding to the track such that the at least one sliding block operatively slides back and forth along the track; and
   at least one side cover, having a protective plate and an assembly member provided on a top of the protective plate, wherein the assembly member is inserted into the mounting slot through the insertion hole, and the assembly member is provided with a notch,
   wherein the convex portion of the at least one sliding block slides back and forth with the at least one sliding block to drive the convex portion to be inserted into or disengaged from the notch of the at least one side cover such that the at least one side cover is operatively fixed or detached from the at least one temple.

2. The assembly structure of the glasses side cover of claim 1, wherein when the at least one side cover is fixed to the at least one temple, two adjacent side edges of the protective plate abut against a bottom of the at least one temple and one side of the frame, respectively.

3. The assembly structure of the glasses side cover of claim 1, wherein the mounting slot is provided on an inner surface of the at least one temple.

4. The assembly structure of the glasses side cover of claim 1, wherein the at least one sliding block is provided with a first perforation, the at least one side cover is provided with a second perforation, the mounting slot of the at least one temple is provided with a third perforation that is aligned and communicates with the second perforation, and when the convex portion of the at least one sliding block slides to the notch of the at least one side cover, the first perforation is aligned and communicates with the second perforation and the third perforation, and at least one screw is screwed to the first, second and third perforations which are aligned and communicated.

5. The assembly structure of the glasses side cover of claim 1, wherein the at least one mounting slot is provided with at least one first buckle adjacent to a wall of a pivot base, the at least one sliding block is provided with at least one second buckle, and when the convex portion of the at least one sliding block is embedded in the notch, the second buckle is fastened into the first buckle.

6. The assembly structure of the glasses side cover of claim 1, wherein the at least one mounting slot is provided with a stop portion opposite to the wall on one side of the pivot base, and when the convex portion of the at least one sliding block leaves the notch, one side of the at least one sliding block abuts against the stop portion.

* * * * *